Figure 6:
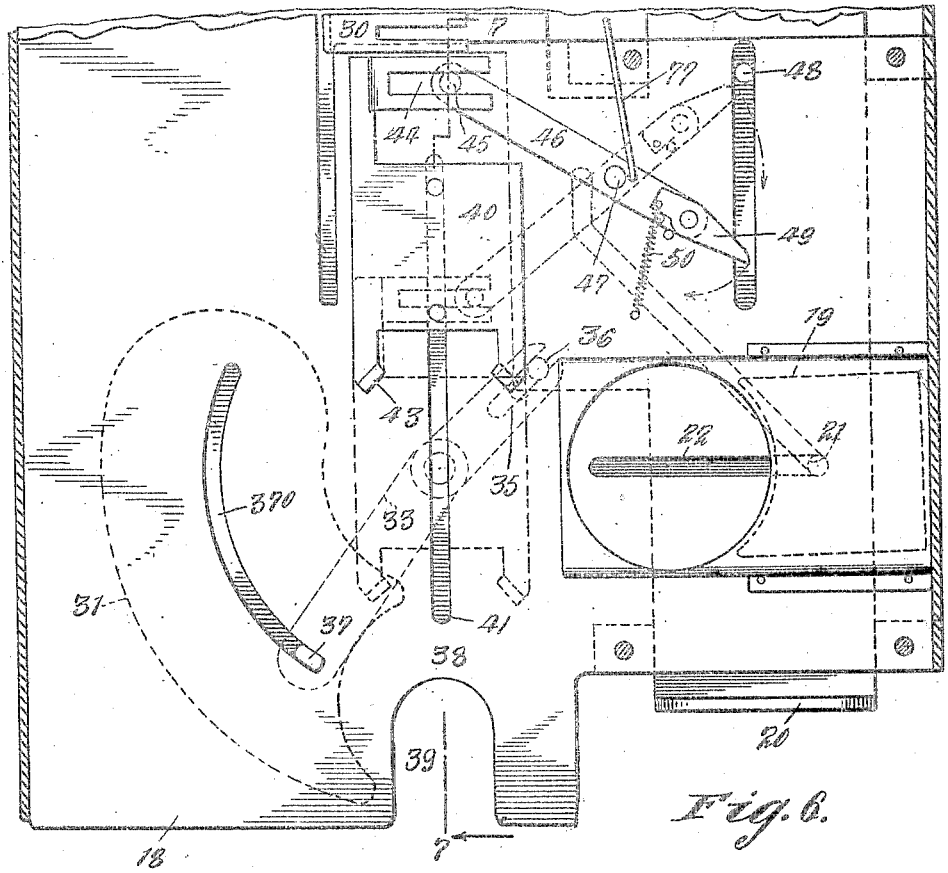

A. T. MAISCH.
SANDWICH MACHINE.
APPLICATION FILED DEC. 7, 1911.
1,108,454.
Patented Aug. 25, 1914.
4 SHEETS—SHEET 1.
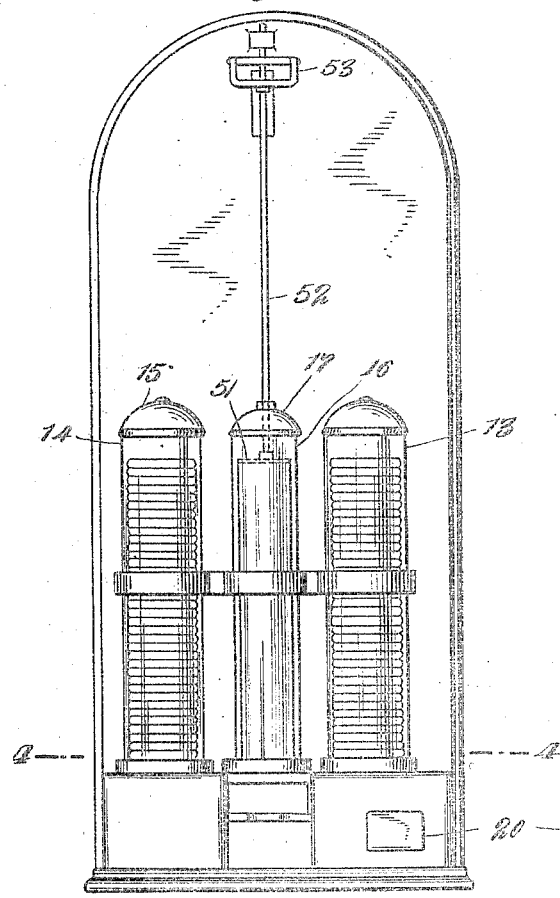
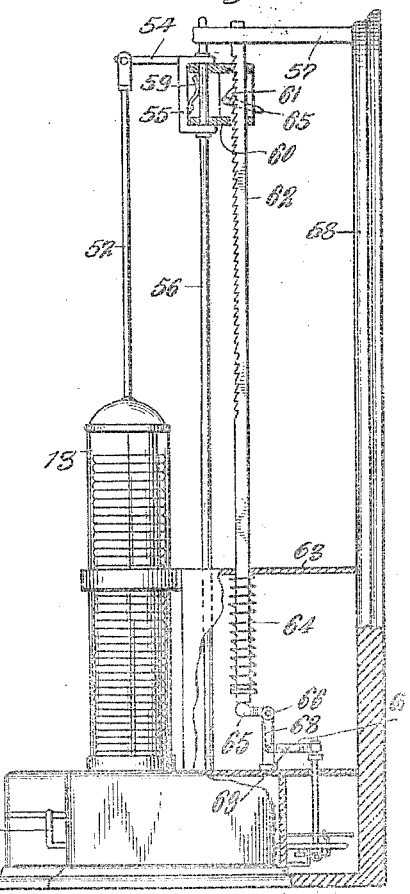
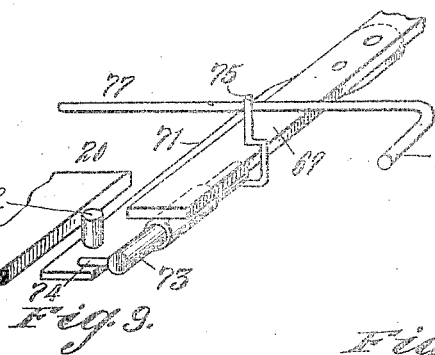
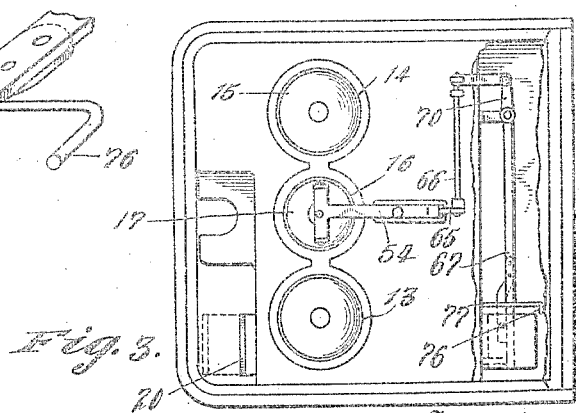

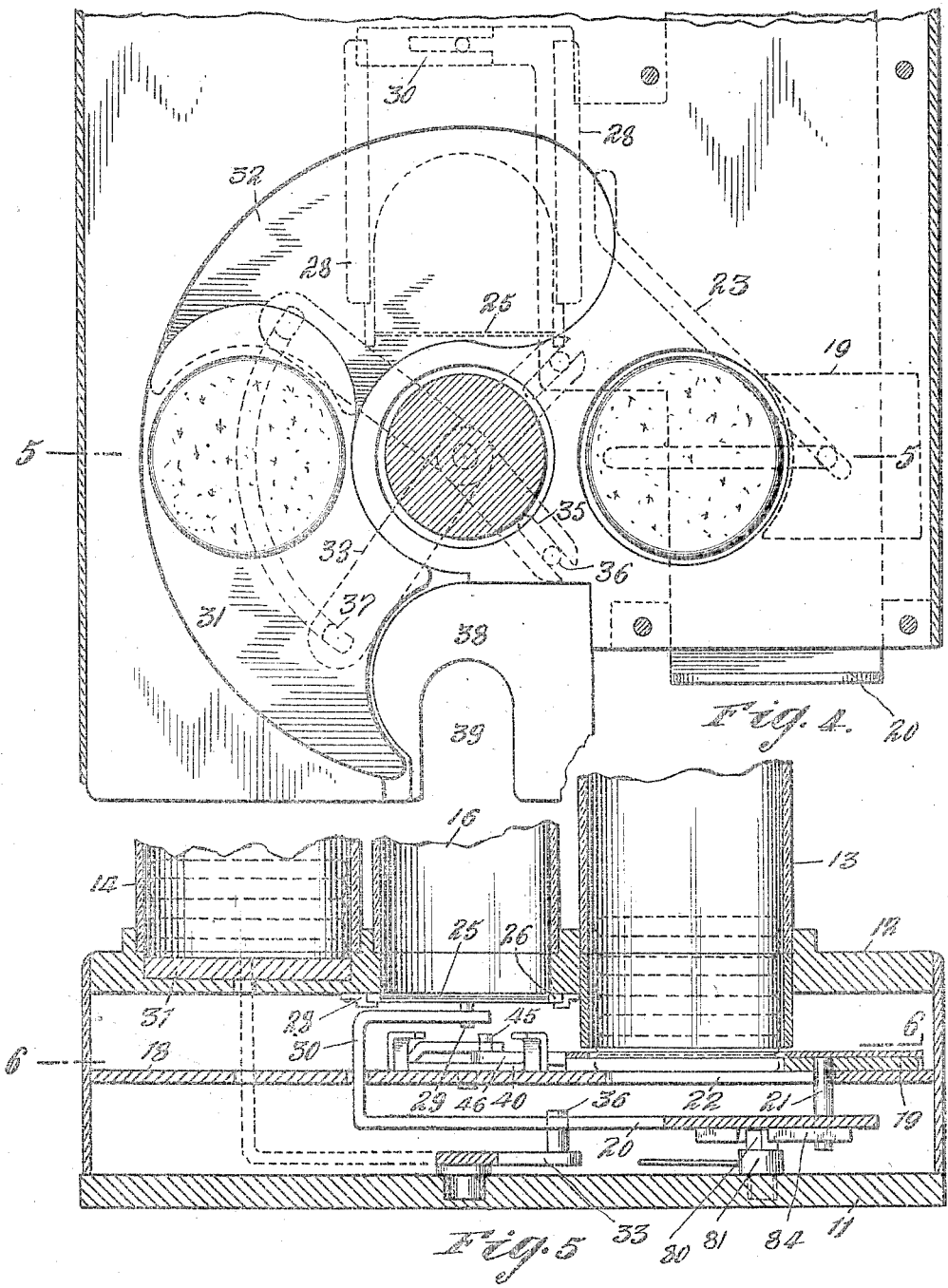

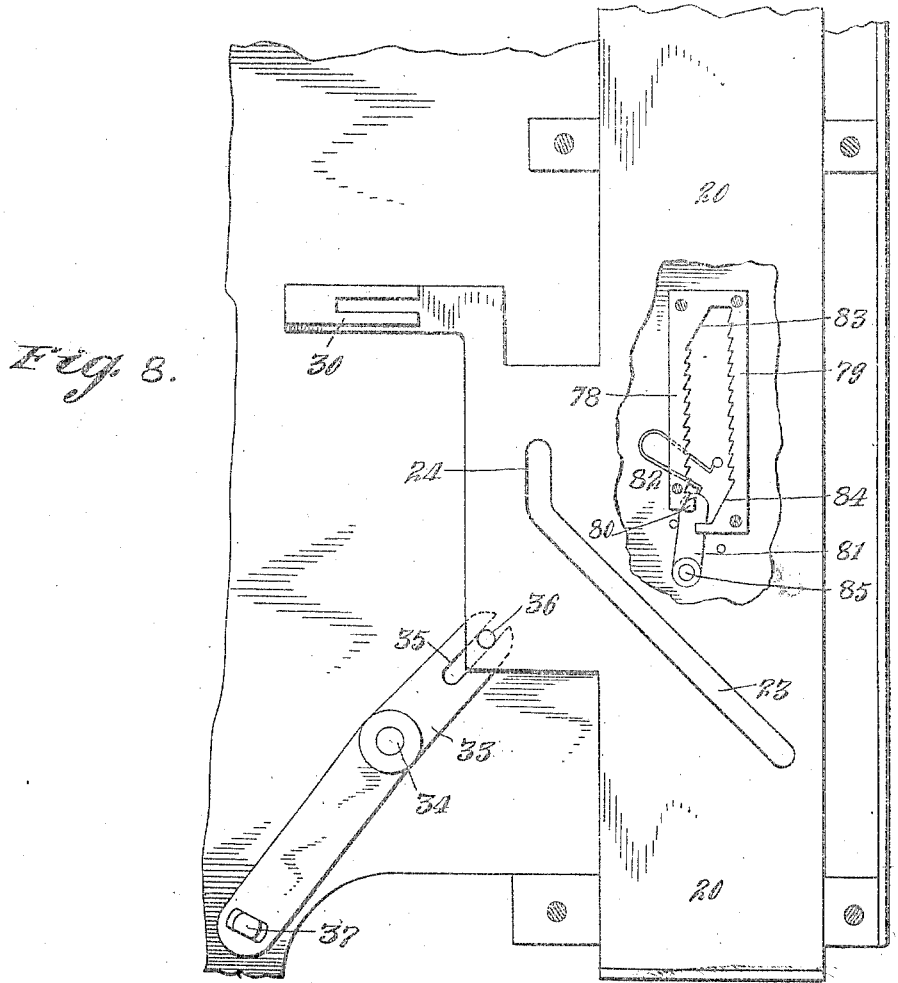

UNITED STATES PATENT OFFICE.

AUGUST T. MAISCH, OF NEW YORK, N. Y., ASSIGNOR TO S. M. M. MANUFACTURING CORPORATION, A CORPORATION OF NEW YORK.

SANDWICH-MACHINE.

1,108,454.

Specification of Letters Patent.

Patented Aug. 25, 1914.

Application filed December 7, 1911. Serial No. 664,335.

*To all whom it may concern:*

Be it known that I, AUGUST T. MAISCH, citizen of the United States, and a resident of New York city, borough of Brooklyn, in the county of Kings and State of New York, have invented certain new and useful Improvements in Sandwich-Machines, of which the following is a specification.

This invention relates to a machine for making sandwiches and particularly to a machine for making and forthwith dispensing the sandwiches.

The form of the mechanism illustrated is designed for making a sandwich consisting of a slice of cheese between two crackers. It will be obvious that other cereal or bread products may be used as the supporting or investing material and that the filler may be sliced from a mass of material other than cheese. In fact the machine is capable of superposing two or more bodies, one of which it has previously severed from a larger mass, and passing the aggregate to a point of delivery.

The present mechanism may be used for placing a portion of cheese on a cracker and passing the same to a position of easy access. It may go still further and place a second cracker on the cheese, which will then give a complete sandwich embodying the filler and the two covering portions.

In the drawings accompanying and forming a part of this specification, a practicable embodiment of the invention is illustrated, wherein—

Figure 7:
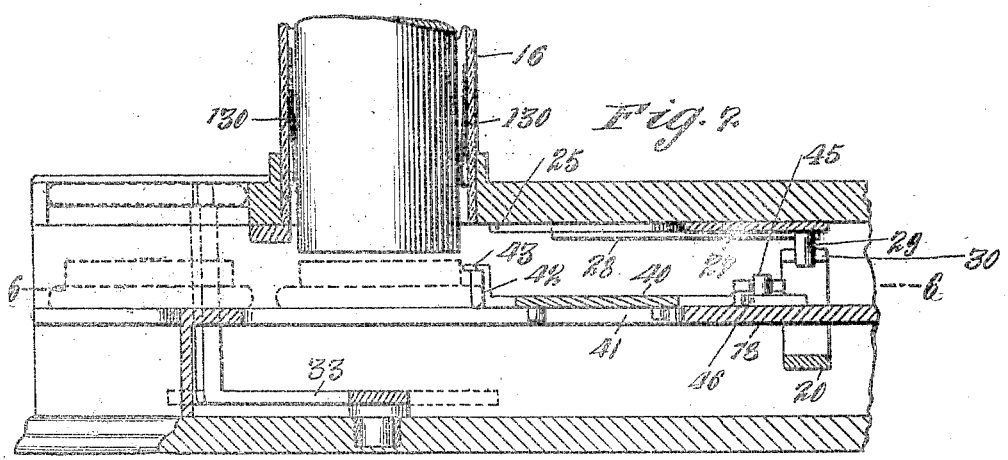

Figure 1 is a front view. Fig. 2 is a side view partly shown in vertical section. Fig. 3 is a plan view, with the parts broken away to show certain of the mechanism. Fig. 4 is a horizontal sectional view taken at about the plane indicated by the line 4—4 in Fig. 1. Fig. 5 is a vertical section taken at about the plane indicated by the line 5—5 in Fig. 4. Fig. 6 is a horizontal section taken at about the line 6—6 in Figs. 5 and 7. Fig. 7 is a vertical section taken at about the line 7—7 of Fig. 6, looking in the direction of the arrow. Fig. 8 is a detail plan view of the draw-bar and certain of its connections. (The draw-bar is shown broken away to illustrate the mechanism for preventing a return movement of the draw-bar before it has completed its full excursion in either direction;) and Fig. 9 is a detail in perspective of mechanism for tripping a by-pass connected with the cheese-follower.

A housing is provided for the mechanism which comprises a bottom-plate 11, and a top-plate 12. This top-plate 12 is shown supporting a pair of cracker-containers 13, 14, which, if desired, may be glass tubes, which will clearly reveal the contents. These tubes may be closed in some suitable manner as, for instance, by caps 15. Located between the cracker-containers is a cheese-container 16, having a cap 17. This cheese container may also, if desired, be made of glass.

There is shown mounted between the top and bottom-plates 12 and 11, an intermediate partition 18, which will support some of the mechanism. The mechanism here illustrated will pass the lowest cracker from the container 13, to a position to receive a slice of cheese, which will be cut from the bottom of the cheese in the container. The cheese-laden cracker will then be moved away from this position, a cracker will be moved from the other container (the lowermost cracker also in this instance), and placed upon the slice of cheese, when the sandwich thus made will be presented in position for delivery, in the present illustration upon a delivery-shelf.

The lower portion of the container 13, is shown extending through the plate 12, and almost to the partition 18. A pusher or ejector 19, is maintained in suitable ways on the partition 18, for reciprocation under the container 13, and toward and from a position under the cheese-container. The mechanism, in the present instance, will be actuated by a draw-bar 20, mounted for reciprocation, in the present instance, in a direction from front to back of the machine, which is in a direction transversely of the direction of movement of the pusher 19. The pusher 19 is provided with a pin 21, which traverses a slot 22, in the partition 18, and also traverses an obliquely-disposed slot 23, in the draw-bar 20. When the draw-bar is pulled forward the cam-face on the side of the slot 23 will draw the pusher toward the cheese-container,—that is, toward the left in Fig. 5,—and move the lowermost cracker from the container 13 to a position under the cheese-container. A slight pause or dwell will be given to the pusher 19 by means of a longitudinally-disposed portion 24, of the slot 23.

The knife for severing the cheese, or rather for slicing the mass within the container 16, is shown mounted for reciprocation in a direction from front to back of the machine. The knife, in the present illustration, is a wire 25, mounted upon the arms 26, of a slide 27, disposed in suitable ways 28. The knife will be reciprocated so as to slice from the bottom of the mass of cheese within the receptacle 16. The cheese will preferably be formed in a column conforming in cross-section to the shape of the crackers intended to be used. In the present showing round crackers are illustrated and the cheese is formed in a cylinder of somewhat less diameter than the diameter of the crackers. Some suitable frictional support may be furnished for the column of cheese. In the drawings a series of spring fingers 130, is shown for supporting the weight of the cheese, but which will yield to the influence of the follower. The knife and pusher 19 will be timed one relatively to the other, so that the cracker will be delivered in position to receive the slice of cheese when this is severed from the cheese mass. The slide 27 is provided with a pin 29, for the engagement of a forked end 30, carried by the draw-bar 20.

Upon the forward movement of the draw-bar the knife will be moved forward, the knife-slide will be given a certain amount of lost motion so that the cracker may be advancing toward its position under the cheese-container before the knife becomes active upon the cheese. By the time the pin 21 has reached the longitudinal portion 24 of its slot, the cracker will have arrived at its position, but the knife will not have completed the severance of the slice of cheese from the cheese mass. This will assure the cracker being at its final position before the cheese falls. By this means the proper location of the cheese upon the cracker is assured. The movement just described takes place during the forward movement, or outward movement as it might be termed, of the draw-bar. The inner movement of the draw-bar causes the pusher 19 to assume its initial position and the knife to pass freely under the cheese and assume its initial position.

A pusher or ejector 31, is mounted for movement in a segmental race-way 32, in the plate 12, and passes below the cracker-container 14. The pusher 31 will be actuated by means of a lever 33, which is shown pivoted at 34 to the bottom-plate 11. This lever is provided with a forked end 35, which embraces a pin 36, carried by the draw-bar. The lever 33 has an upstanding end 37, which is shown passing through a slot 370, in the partition 18, through a slot in the plate 12, into the segmental race-way 32, and engaging a suitable opening in the pusher 31, whereby, upon the inward movement of the draw-bar the pusher 31 will be advanced and upon the outward movement of the draw-bar, the pusher 31 will be retracted to its initial position. In Fig. 6 the outward position of the pusher is shown in dotted lines. The lowermost cracker of the pile within the container 14 will drop into position in front of the pusher upon this assuming its rearward or initial position. Upon the backward or inward movement of the draw-bar the pusher 31 will be advanced and will force the cracker in front of it through the race-way 32 and cause the same to drop upon the delivery-plate 38.

The delivery-plate 38 is shown provided with an opening 39, for the thumb or finger of the patron of the machine. This will enable a ready removal of the sandwich and also permit the removal of the same without the fingers of such patron engaging any portion of the delivery-shelf over which the succeeding sandwich will be delivered.

Before the cracker from the second container 14 is permitted to fall upon the delivery-shelf, the first cracker, laden with its slice of cheese, will be moved forward on to the delivery-shelf and into a position to receive the second cracker. A pusher or ejector is provided for this purpose comprising a slide 40, reciprocatory in a line from front to back of the machine and guided by pins traversing a slot 41, in the partition 18. The pusher is provided with a pair of faces 42, for engaging the cracker, and a pair of faces 43, for engaging the cheese, so that in the advance movement the cheese will not be displaced from its proper position upon the cracker. The ejector or pusher 41 is provided with a slot 44, the sides of which embrace a pin 45, carried by a lever 46, pivoted at 47 to a plate 18, and which lever will be moved for effecting the forward movement of the pusher by engagement with a pin 48, carried by the draw-bar, the engagement taking place upon the backward movement or inward movement of the draw-bar. A by-pass lever 49, is carried by the end of the lever 46, and is controlled by a spring 50, which not only controls the by-pass, but also draws the entire lever and with it the slide 40, to the backward or initial position after the pin 48 has moved to such a position that it will become disengaged from the end of the lever 46, the by-pass 49 being effective to permit the pin 48 to pass the end of the lever upon the forward movement of the draw-bar. The ejector 40 is timed, by means of its connections with the draw-bar, to eject the first cracker with the cheese and push this out upon the delivery-shelf in time to receive the second cracker when this is advanced by the pusher 31.

It will be necessary to advance the cheese through steps of determined distance so that a predetermined amount of cheese, a slice of given thickness, may be delivered upon each cracker which is passed below the cheese-container. It is also necessary that the cheese be advanced at a time when the knife is in its idle or retracted position and that the cheese remain stationary during the slicing action of the knife and during that portion of the retraction of the knife when the knife is under the cheese mass. A follower 51, is shown mounted in the cheese-container, which follower is connected to a follower-bar 52, passing through the cap 17. The follower-bar is shown mounted upon a yoke 53, which is pivoted to an arm 54, extending from a bracket 55, which is mounted for reciprocation upon a vertical rod 56, which rod is supported by the top-plate of the machine and by an outstanding arm 57, carried by the back 58, of the cabinet. The bracket 55 is shown provided with a leaf-spring 59, which engages the rod 56 and holds the bracket in the required position. When it is desired to recharge the container 16, the follower will be withdrawn from the container and the bracket 55 may be turned on the rod 56 as a pivot, to get the follower out of alinement with the container. Mounted upon the rod 56 is a second bracket 60, which is mounted within the bracket 55. The bracket 60 carries a pawl 61, which engages a rack-bar 62, which is mounted for reciprocation in the arm 57 and the upper portion 63, of a housing. The rack-bar is moved toward its lower position by means of a compression spring 64, located between the portion 63 of the housing and a suitable head upon the rack-bar. The pawl has a tripping device 65, to assist in permitting the raising of the brackets 55 and 60 and the follower 51. The rack-bar will be raised during the inward or return movement of the draw-bar, and upon a tripped or quick release, the rack-bar will move downward incident to the action of the spring 64, and advance the follower 51 a predetermined distance. In the present instance the reciprocation of the rack-bar 62 is effected by means of the spring 64 above referred to, and a rock-arm or cam 65, which is mounted on a rock-shaft 66. The rock-shaft is connected to a lever 67, which is pivoted at the back of the machine for swinging in a horizontal plane, the rock-shaft 66, being provided with an arm 68, which is connected by a link 69, to an arm 70, of the lever 67. The lever 67 is provided with a spring member 71, which carries an abutment 72, for the engagement of the rear of the draw-bar 20 upon its rearward or inward movement. The abutment 72 and its carrying-spring 71 is in the nature of a by-pass which is actuated by means of a rock-shaft 73, which carries a pin 74, for depressing the spring 71 and moving the abutment 72 below the draw-bar 20. The rock-shaft 73 carries an arm 75, by which it may be rocked. In the present instance it is rocked at the appropriate time by means of a tripper 76, which is in the form of a hooked rod 77, which is carried by the lever 46, and in such position that during the backward movement of the draw-bar the hook 76 will be advanced to a position almost to be touched by the arm 75 in its rearward position. Upon the pin 48 disengaging the lever 46, and this lever's sudden forward movement incident to the impulse of the spring 50, the hook 76 will strike the arm 75, rock the lever 73, which will depress the abutment 75, and move this out of engagement with the draw-bar, whereupon the rack-bar will return to its normal position incident to the action of its spring. Upon the inward movement of the draw-bar 20, the lever 67 will be rocked, the cam 65 will also be rocked, and will rise, and with it raise the rack-bar 66 a predetermined distance, in the present organization a distance of one tooth.

In a device of this character it is quite desirable to prevent incomplete movements of the parts after their movement has been inaugurated. The draw-bar is shown provided with a pair of rack-bars 78, 79, which engage a pawl 80, mounted upon a lever 81, which is pivoted upon the bottom part of the housing. A spring 82, is provided which will hold the pawl 80 in engagement with whichever of the rack-bars it has been moved toward. At the end of the rack-bar 78 is a slanting face 83, for moving the pawl into engagement with the rack-bar 79, and at the end of the rack-bar 79 is a face 84, for moving the pawl into engagement with the rack-bar 78. The rack-bar 78 will be effective upon the forward movement of the draw-bar 20. After the draw-bar has about completed its forward movement, the face 83 will move the pawl into engagement with the rack-bar 79 for the reverse movement. By this means, after the motion in either direction has been inaugurated, it will be impossible to effect a retrograde movement. To enable the return movement, when it is necessary, the lever 81 may be provided with a tripping device 85, sufficiently guarded from the public so that if it is desired at any time to move the pawl from one rack-bar to the other before the draw-bar has made a complete movement, this may readily be effected.

Although but one form of the invention has been illustrated and particularly described, yet it will be apparent that many changes may be made without departing from the spirit of the invention.

I claim:

1. The combination with a cracker-container, of a cheese-container, a pusher for shifting a cracker from the cracker-container to a position below the cheese-container, a knife for slicing cheese contained in such container upon the said cracker, and an ejector having faces for respectively engaging the cracker and the cheese.

2. In a sandwich machine, the combination with a pair of cracker-containers, an ejector for each cracker-container, of a cheese-container, a knife for the cheese-container, a follower for the cheese-container, an ejector for the assembled sandwich, an actuator operatively connected with the ejectors, knife and follower and timed for functioning the respective ejectors, knife and follower in timed sequence, and mechanism for preventing retrograde movement of the actuator after the inauguration of its movement.

3. A sandwich forming and delivering device comprising a casing, means operating within the casing for depositing a slice of filling material on one of the covering members of a sandwich, a delivery table located exteriorly of the casing, means for placing said covering material and filler upon said delivery table, and means for placing the second covering member upon the filler upon the delivery table.

4. In a sandwich machine, means for positioning the investing material in place for the reception of the filling material, means for removing the filling material so as to place it on said investing material, means for delivering the sandwich so formed, and a single reciprocating operating member for all of said means.

5. In a sandwich machine, means for positioning the investing material in place for the reception of the filling material, means for removing the filling material so as to place it on said investing material, means for delivering the sandwich so formed, and a single manually controlled reciprocating operating member for all of said means.

6. In a sandwich machine, means for positioning the investing material in place for the reception of the filling material, means for removing the filling material so as to place it on said investing material, means for delivering the sandwich so formed, and a single reciprocating operating member for all of said means, said member operating the first two mentioned means during its reciprocation in one direction and operating the last mentioned means during its reciprocation in the opposite direction.

7. In a device of the character specified, the combination with a pair of upright containers for crackers and between these an upright container for cheese, a pusher mounted to move under one of the cracker-containers and shift the lowest cracker to a position under the cheese-container, a reciprocating knife for severing a slice off the bottom of a column of cheese in the cheese-container, a pusher having a face for engaging the cracker and a face for engaging the slice of cheese, then for moving the cheese-laden cracker to a point of delivery, and a pusher for moving the lowest cracker of the other pile on to the said slice of cheese, a draw-bar, and connections between the draw-bar, the respective pushers, and knife for causing the functioning thereof in timed sequence.

8. The combination with a pair of cracker receptacles and a filler receptacle, of mechanism for shifting a cracker from one receptacle and placing the same below the filler receptacle, mechanism for slicing the filler upon the said placed cracker, mechanism for shifting the filler-laden cracker to a point of delivery, and mechanism for shifting a cracker from the other receptacle and placing the same upon the said sliced filler, a cheese follower, a reciprocatory rack-bar for advancing the follower step by step, a rock-shaft and cam for advancing the rack-bar and a spring for retracting the same, a lever for raising the rock-shaft, a by-pass on the lever for the engagement of the draw-bar upon its recession, a rock-shaft and cam for tripping the by-pass, a lever having a spring for its retraction and a by-pass for the engagement of the draw-bar upon its rearward movement and timed for release to its spring upon the draw-bar assuming its rearward position, a tripper carried by the said lever for engaging the said by-pass and rock-shaft and releasing the same upon the movement of said lever responsive to its spring.

9. In a machine of the character described, a casing, a container within the casing for holding fragile material to be dispensed, means for advancing a portion of said material while the same is continually supported, means within the casing for placing a non-fragile material upon said fragile material, and means for delivering the superimposed materials to a point without the casing.

Signed at New York city, in the county of New York, and State of New York, this 6th day of December A. D. 1911.

AUGUST T. MAISCH.

Witnesses:
Frank M. Ashley,
Manuel M. Voit.